P. J. MEAD.
BRICK MACHINE.
APPLICATION FILED SEPT. 22, 1908.

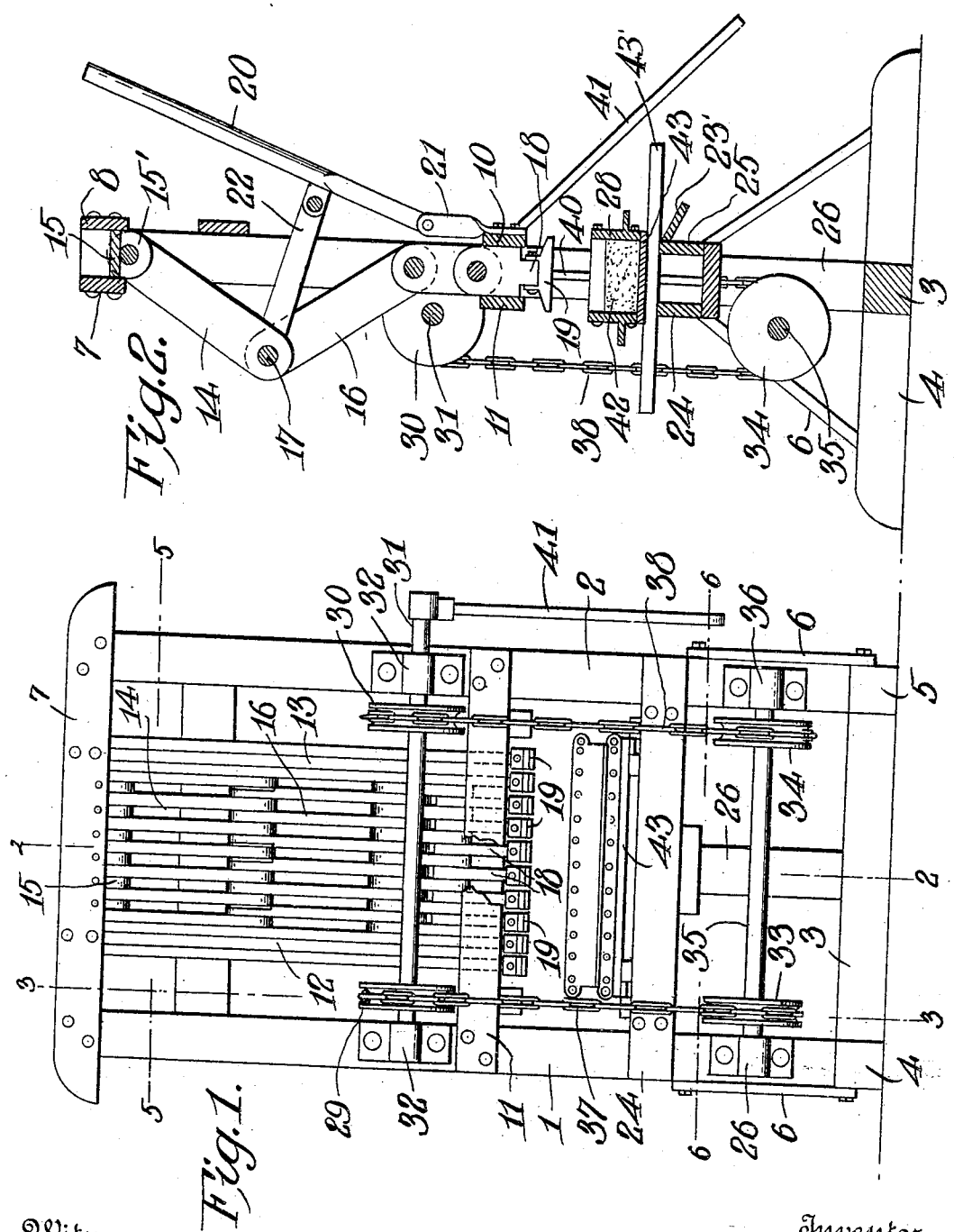

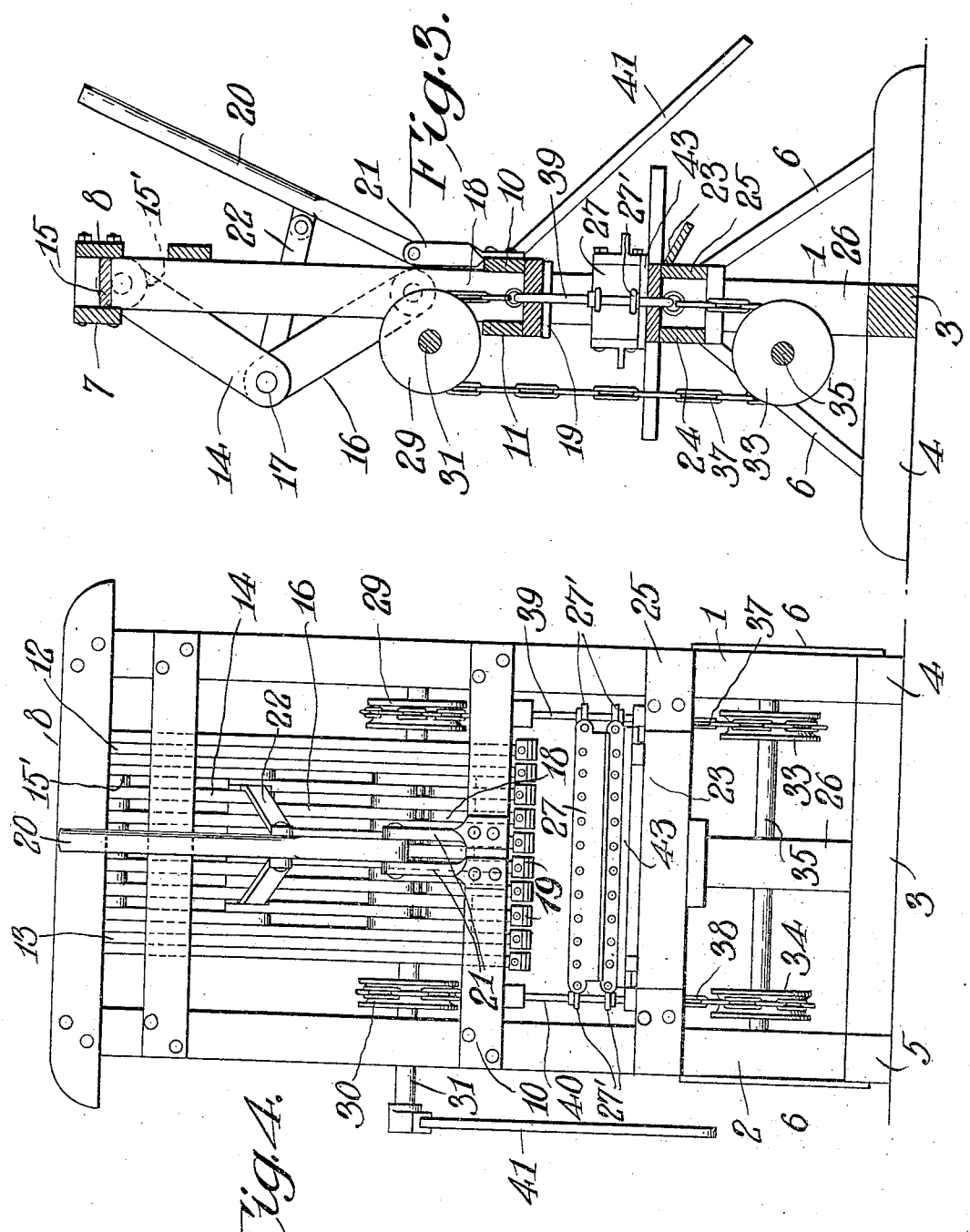

940,177.

Patented Nov. 16, 1909.
3 SHEETS—SHEET 3.

Witnesses
C. E. Smith.
C. H. Griesbauer.

Inventor
P. J. Mead,
By H. B. Willson & Co
Attorneys

UNITED STATES PATENT OFFICE.

PHILIP J. MEAD, OF MORENCI, MICHIGAN.

BRICK-MACHINE.

940,177.

Specification of Letters Patent.  Patented Nov. 16, 1909.

Application filed September 22, 1908.  Serial No. 454,180.

*To all whom it may concern:*

Be it known that I, PHILIP J. MEAD, a citizen of the United States, residing at Morenci, in the county of Lenawee and State of Michigan, have invented certain new and useful Improvements in Brick-Machines; and I do declare the following to be a full, clear, and exact description of the invention, such as will enable others skilled in the art to which it appertains to make and use the same.

This invention relates to an improved brick molding machine for molding cement bricks and blocks.

The object of the invention is to provide a simply constructed, efficient and strong machine of this class in which the plungers or dies are constructed to move straight downward into the mold box and cause a straight downward pressure.

Another object of the invention is to provide means for raising the mold box to leave the molded articles on the pallet board in position ready for removal.

Another object is to provide a mold box in which the partitions are removably secured to adapt the machine for molding bricks or large blocks, as may be desired.

With these and other objects in view, the invention consists of certain novel features of construction, combination and arrangement of parts, as will be more fully described and particularly pointed out in the appended claim.

Figure 5:
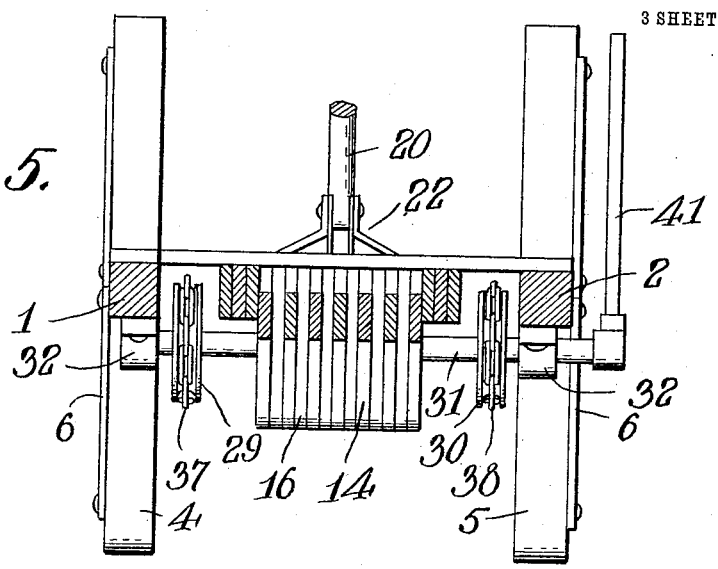
Figure 6:
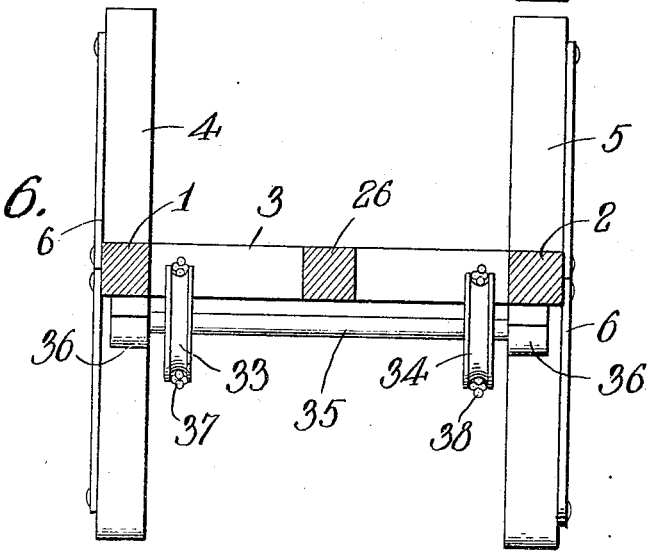
Figure 7:
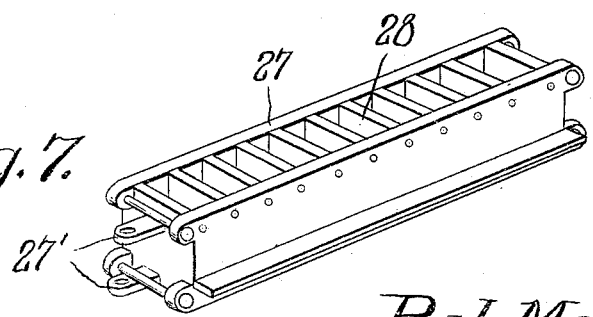

In the accompanying drawings, Figure 1 is a front elevation with parts broken out showing the plungers in raised position, Fig. 2 is a vertical section taken on the line 2—2 of Fig. 1, Fig. 3 is a similar view taken on the line 3—3 of Fig. 1, Fig. 4 is a rear elevation of a portion of the machine, Fig. 5 is a horizontal section taken on the line 5—5 of Fig. 1, Fig. 6 is a similar view taken on the line 6—6 of Fig. 1, Fig. 7 is a detail perspective view of the mold.

In the embodiment illustrated a supporting structure is shown preferably composed of laterally spaced uprights 1 and 2, connected at their lower ends by a cross bar 3, and having base members 4 and 5 connected therewith and braced by bars as 6, fastened at one end to the uprights 1 and 2 and at their other ends near the free ends of the members 4 and 5.

The upper ends of the posts or uprights 1 and 2 are preferably connected by braces 7 and 8, arranged on opposite sides thereof and which form guides for the upper end of the plunger head and between opposite ends of which are mounted bars or blocks 15 for a purpose to be described. Cross bars 10 and 11 are also preferably arranged intermediately of the ends of said uprights 1 and 2, preferably at a point about midway thereof, and which form guides for the lower ends of the plungers to be described. A plunger head A is composed of two spaced vertically disposed beams or bars 12 and 13, arranged between the posts 1 and 2 and spaced therefrom with their lower ends projecting a short distance below the cross bars or guides 10 and 11.

Arranged between the vertical members 12 and 13 are a plurality of links as 14, pivotally connected at their upper ends between spaced lugs as 15′, formed on the cross bar or brace 8. Similar links as 16, are pivotally connected at their upper ends with the lower ends of the links 14, preferably by means of a single rod 17 extending therethrough to form knuckle jointed members, and the lower ends of these links 16 are pivotally connected with the upper ends of the plunger rods or stems as 18, said stems 18 being arranged between the bars 12 and 13. Plunger shoes or tampers as 19, are detachably mounted on the lower ends of the stems 18 and the members 12 and 13 for a purpose to be described. The lower end of the members 12 and 13 and the rods or stems 18 are held securely together by bolts 18ᵃ and 18ᵇ and the links 16 are pivotally connected to the upper ends of said stems 18 by bolt 16′, which is also journaled in the bars 12 and 13. An operating lever 20 is pivotally connected at one end in a bracket 21, mounted on the cross bar 10 and said lever is also pivotally connected with one end of straps as 22, which are connected at their other ends with the pivot rod 17 which connects the links 14 and 16. When it is desired to raise the plungers 19 the lever 20 is pushed upward which causes the links 14 and 16 to bend outwardly at their pivotal connection and the members 12 and 13 to move upward between the guides formed by the intermediate cross bars 10 and 11, and the upper bars 7 and 8 and raise the plungers vertically a predetermined distance. When it is desired to lower the plungers the lever is depressed causing the links to straighten out and force the plungers downward in a straight line thereby producing a straight downard pressure of the plungers within the mold.

A table 23 is suitably supported beneath the mold to be described, and is made vertically adjustable by any suitable means to vary the thickness of the bricks to be molded. This table preferably comprises cross bars 24 and 25, extending on opposite sides of the uprights 1 and 2, which serve as guides therefor and these bars 24 and 25 are connected at their opposite ends by members 24' and 25' and bolts 24" and 25". A supporting post 26, is preferably arranged between the lower ends of the uprights 1 and 2 underneath the table 23 to brace and strengthen it during the pressing action exerted on the bricks.

A mold box 27, preferably made of cast-iron sides and ends bolted together to form a rigid structure is arranged on a pallet supported by the table 23 in position below the plungers 19 and is guided and held in such position by means hereinafter described. This box 27 is provided with a plurality of longitudinally spaced transversely extending partitions removably secured therein by means of bolts or in any other suitable manner. When desired these partitions may be removed and the plungers 19 detached and a single plunger substituted therefor, to adapt the mold to be used for forming cement blocks or beams. The mold may be made of any desired size, being preferably made about $5\frac{3}{4}$ inches deep, the plungers being arranged to compress the cement therein down to about 4 inches whereby a brick measuring $4 \times 8\frac{1}{4} \times 2\frac{1}{4}$ may be formed but they may be varied to suit the wishes of the operator.

Two pulleys 29 and 30 are mounted on a rod 31, supported by brackets as 32, fastened to the uprights 1 and 2 at points above the cross bars 10 and 11. Similar pulleys 33 and 34 are mounted on a rod 35 journaled in bearings 36 supported on the lower ends of the uprights 1 and 2 preferably near the base of the machine. Two chains 37 and 38 pass over pulleys 29 and 30 and around the pulleys 33 and 34, and are connected at their opposite ends with the opposite ends of guide rods 39 and 40, to which the mold box 27 is secured preferably by means of lugs 27' extending laterally therefrom and which move vertically in the bars 24' and 25' of the table 23 to guide the movement of the mold box to cause it to move vertically upward from the bricks.

A lever 41 is connected with the rod 31 for operating the chains 37 and 38 to raise and lower the mold when desired, the raising of said lever 41 operating to lift the mold for about six inches, said box after it has been raised about four inches engaging with the plungers and carrying them with it for a distance of about two inches whereby the mold and plungers are entirely disengaged from the molded bricks, 42, which are left free on the pallet board 43, said board being adapted to be moved forward to remove the bricks from the machine. This pallet board 43 is preferably provided with laterally extending handles, as 43', on each side, designed to facilitate the removal of the board 43 with the completed bricks.

The construction of this machine adapts it for applying a five-hundred pound straight downward pressure to each brick, and the machine being an upright one two men can work it, one on one side operating the levers and filling it, and the other on the other side to carry away or remove the completed brick.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

I claim as my invention:

In a brick molding machine, the combination of a supporting base, spaced uprights secured thereto, oppositely disposed cross bars connecting the outer faces of the upper ends of said uprights, a bar mounted between said cross bars and having depending longitudinally spaced apertured lugs, links pivotally connected at one end to said lugs, oppositely disposed cross bars connecting the outer faces of said uprights intermediately of their ends, plungers mounted to move vertically between said intermediate cross bars, links pivotally connected at one end to said plungers and at their other ends to the free ends of said first mentioned links, a cross bar arranged at the front of said frame to limit the movement of said links, a table mounted between said uprights, a vertically movable mold box arranged below said plungers in position to receive them, means for raising and lowering said mold box, and means for operating said links to raise and lower the plungers.

In testimony whereof I have hereunto set my hand in presence of two subscribing witnesses.

PHILIP J. MEAD.

Witnesses:
ALBERT V. FOSTER,
EUGENE WARD.